United States Patent
Xue et al.

(10) Patent No.: US 9,866,730 B2
(45) Date of Patent: Jan. 9, 2018

(54) SEMI-FIXED-HUE GAMUT COMPRESSION

(71) Applicant: Intel Corporation, Santa Clara, CA (US)

(72) Inventors: Jingyang Xue, Sunnyvale, CA (US); Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 14/774,652

(22) PCT Filed: Mar. 28, 2014

(86) PCT No.: PCT/US2014/032245
§ 371 (c)(1),
(2) Date: Sep. 10, 2015

(87) PCT Pub. No.: WO2014/193531
PCT Pub. Date: Dec. 4, 2014

(65) Prior Publication Data
US 2016/0037019 A1    Feb. 4, 2016

Related U.S. Application Data

(60) Provisional application No. 61/829,310, filed on May 31, 2013.

(51) Int. Cl.
*G09G 5/02* (2006.01)
*H04N 1/60* (2006.01)
*H04N 1/46* (2006.01)

(52) U.S. Cl.
CPC .......... *H04N 1/6075* (2013.01); *H04N 1/46* (2013.01); *H04N 1/60* (2013.01); *H04N 1/6061* (2013.01); *H04N 2201/0089* (2013.01)

(58) Field of Classification Search
None
See application file for complete search history.

(56) References Cited

U.S. PATENT DOCUMENTS

| 5,311,295 A | 5/1994 | Tallman et al. |
|---|---|---|
| 6,335,983 B1 | 1/2002 | McCarthy et al. |

(Continued)

FOREIGN PATENT DOCUMENTS

| CN | 102577396 | 7/2012 |
|---|---|---|
| KR | 10-20110031696 A | 5/2011 |

OTHER PUBLICATIONS

International Search Report and Written Opinion dated Aug. 14, 2014, for PCT Patent Application No. PCT/US2014/032245.

(Continued)

*Primary Examiner* — Frank Chen
(74) *Attorney, Agent, or Firm* — Green, Howard & Mughal LLP.

(57) ABSTRACT

One or more apparatus and method for compressing xvYCC or sRGB color to a narrower color gamut. Embodiments may be utilized in processing images/video image sequences provided in a wide gamut color space for display in standard RGB color space. In further embodiments, an sRGB or xvYCC compliant input is compressed to a gamut narrower than sRGB. Embodiments where a narrow output color gamut lacks a fully-defined 3D color space, semi-fixed-hue gamut compression may be performed by adjusting parameters provided to a fixed-hue compression module capable of mapping 3D color space representations between well-defined gamuts.

20 Claims, 10 Drawing Sheets

(56) References Cited

U.S. PATENT DOCUMENTS

| | | | |
|---|---|---|---|
| 7,864,371 B2* | 1/2011 | Shirasawa | H04N 1/603 358/1.9 |
| 8,963,945 B2 | 2/2015 | Kim et al. | |
| 2006/0232803 A1* | 10/2006 | Hori | H04N 1/6058 358/1.9 |
| 2009/0122372 A1* | 5/2009 | Miyahara | H04N 1/6075 358/520 |
| 2009/0154798 A1* | 6/2009 | Mizukura | H04N 1/6058 382/162 |
| 2011/0013208 A1 | 1/2011 | Bhaskaran et al. | |
| 2011/0267630 A1 | 11/2011 | Mestha et al. | |

OTHER PUBLICATIONS

International Search Report and Written Opinion for International Patent Application No. PCT/US2014/032245, dated Aug. 14, 2014, 12 pages.
Office Action for Chinese Patent Application No. 201480024741.1, dated Jun. 7, 2017.

* cited by examiner

SEMI-FIXED-HUE GAMUT COMPRESSION

CROSS-REFERENCE TO RELATED APPLICATIONS

The present application claims the benefit of priority of National Phase Application PCT/US2014/032245, filed on 28 Mar. 2014, and of U.S. Provisional Application No. 61/829,310, filed 31 May 2013, and titled "A Semi-fixed Hue Compression Method for sRGB to Low-Gamut Mapping", the contents of which are hereby incorporated in their entirety for all purposes.

BACKGROUND

A graphics engine, graphics processing unit (GPU), or visual processing unit (VPU), is a specialized electronic circuit designed to rapidly manipulate and alter memory to accelerate the creation of images in a frame buffer typically intended for output to a display. GPUs may be found in embedded systems, mobile phones, tablets, notebook computers, high performance computation (HPC) servers, and game consoles. In addition to manipulating computer graphics, a highly parallel architecture also enables a GPU to more generally perform processing of large blocks of video stream and image data in parallel.

Video streaming and display devices are now ubiquitous in electronic media. With the rapid development of image and video display devices, the colors and images can be received, manipulated, and reproduced in a variety of color gamuts. Such video/image data are often exchanged between devices having differing output display color gamuts. A device with narrower color gamut that simply clips all values outside the available display gamut may cause loss of details and a reduction in the sense of depth that reduces image quality and disrupts a user's viewing experience. Mapping between color gamuts of differing size (e.g., compression of pixel color values within a wider gamut to a narrower gamut) has therefore become an important function in graphical media processing.

International Color Consortium (ICC) color management defines a limited set of controls for gamut mapping while leaving the user to adjust the original image to fit their final aesthetic goal. These are formally defined as rendering intents which includes four general categories of gamut mapping: (a) Perceptual, which maps all colors smoothly into the target gamut, although those outside of the target gamut will move relatively more than those inside; (b) Saturated, which maintains relative saturation values of colors; (c) Relative colorimetric, which is a minimal color transformation that usually projects out-of-gamut colors to the gamut surface with little or no mapping of in-gamut colors; and (d) Absolute colorimetric, which matches measured value to measured value without aligning the neutral axes.

Gamut mapping/compression methods and systems covering one or more of the gamut mapping categories, which for example may be implemented within a device GPU, may improve user experience and therefore add significant value and functionality to a host electronic media device.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
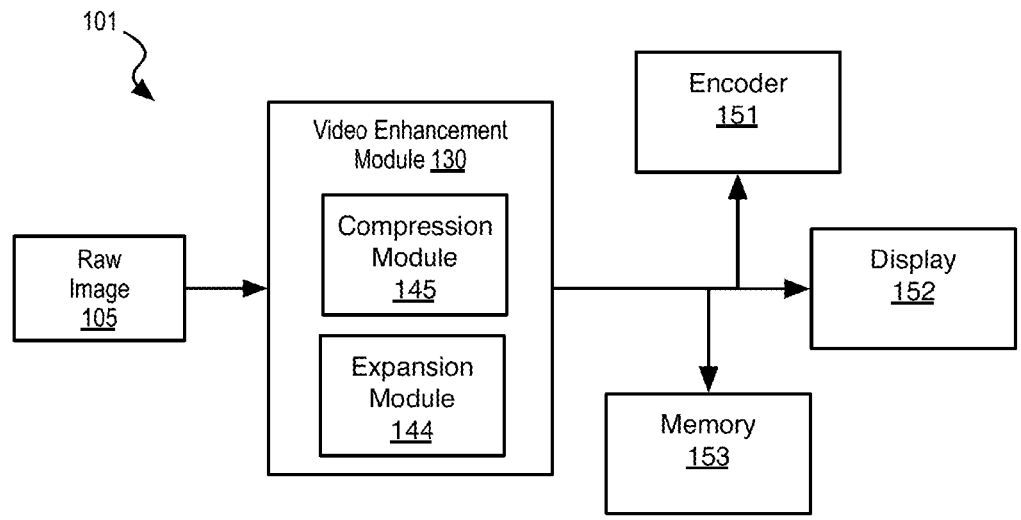
FIG. 1A is a functional block diagram of a video enhancement architecture, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures or GPU architectures for example, implementation of the techniques and/or arrangements described herein are not restricted to particular architectures and/or computing systems and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media are described below for compressing xvYCC (IEC 61966-2-4, January 2006) or sRGB (ITU-R BT.709-5, May 2008, or ITU-RBT.601-7, March 2011) color to a narrower gamut. Such embodiments may be utilized for example in processing video sequences provided in a wide gamut color space for display in sRGB color space. In further embodiments, an sRGB or xvYCC compliant input is compressed to a narrower gamut than the sRGB gamut. An output display supporting a color gamut 50% smaller than sRGB, or less, may be provided in devices, such as smartphones and tablets, as a means of reducing device cost. Embodiments described herein may be suitable for one or more ICC color mapping categories between such output displays and wider gamut raw image sources. As described further below, these embodiments may be implemented with a semi-fixed-hue gamut compression system that utilizes a fixed-hue gamut compression module capable of mapping 3D color space representations between well-defined gamuts (e.g., xvYCC to sRGB) together with a source-target gamut analysis module configured to assess pixel source and output display information. The source-target gamut analysis module may extend fixed-hue gamut compression functionality to a gamut that is narrower than sRGB and lacks a completely defined 3D color space. As described further below, narrow gamut color space primary chromaticity coordinates, and reference white point, provided for example by a display device manufacturer, are related to the sRGB color space as a basis for determining whether to perform compression, and if so, to suitably adjust parameters of a fixed-hue gamut compression module. Some of the techniques and systems described further below are referred to herein as "semi-fixed-hue" color adjustments because chrominance values for input pixels outside of a display gamut narrower than sRGB may be scaled based on a ratio between the display gamut area and the sRGB gamut area (within the xy chromaticity plane), and/or based on an sRGB boundary associated with a given hue angle.

FIG. 1A is a functional block diagram of a video enhancement architecture 101, in accordance with an embodiment. Architecture 101 is to receive a raw image 105 (e.g., one image in a sequence of images comprising a video) as an input. Raw image(s) 105 may contain a plurality of input pixels p. Each pixel $p_i$ is associated with values provided in a color space format, such as, but not limited to, YUV, in which the pixel luma (Y) and chrominance (UV) components may be encoded using YCbCr. Raw image 105 may be output, for example, from a decoder buffer, or from a file stored in a memory, upstream of video enhancement architecture 101. Raw image 105 is received by video (image) enhancement module 130. Video enhancement module 130 includes a compression module 145 and an expansion module 144. Compression module 145 includes logic circuitry to reduce the source color gamut of raw image 105, for example from $u_{p_i,in}$, $v_{p_i,in}$, $y_{p_i,in}$ to $u_{p_i,out}$, $v_{p_i,out}$, $y_{p_i,out}$. Expansion module 144, in contrast, includes logic circuitry to increase the source color gamut employed by pixels p. Video enhancement module 130 outputs the color-adjusted pixels values to a downstream output destination, such as, but not limited to encoder (buffer) 151, to a display (buffer) 152, or to a file stored in a memory 153 (e.g., DRAM, flash).

Figure 1B:
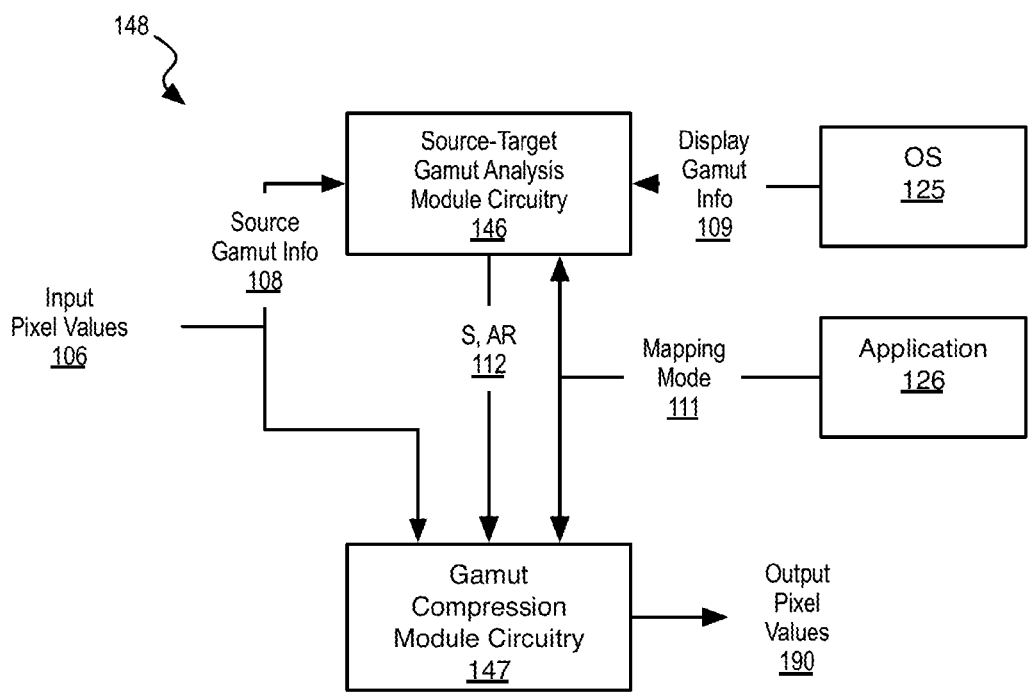
FIG. 1B is a functional block diagram of a gamut compression architecture, which is employed by the video enhancement architecture depicted in FIG. 1A, in accordance with an embodiment.

FIG. 1B is a functional block diagram of a gamut compression architecture 148, which is employed by the gamut compression module 145 depicted in FIG. 1A, in accordance with an embodiment. Gamut compression architecture 148 is to perform multi-mode adaptive gamut compression, with the compression dependent upon differences between the source and display gamut. In embodiments, the multi-mode, adaptive gamut compression includes one or more of: a fixed-hue compression mode, a semi-fixed-hue compression mode, and a bypass mode. In fixed-hue compression mode, source pixels determined to be outside of a display gamut that has a fully defined 3D color space, such as sRGB, are compressed to be within the display gamut as a function of the ICC mapping mode category (e.g., perceptual, saturation, etc.). In semi-fixed-hue compression mode, pixel value compression is performed based on differences between the source and display gamut only if the display gamut is determined to be narrower than source gamut by a predetermined threshold amount, and does not have a fully-defined 3D color space (e.g., the display does not comport with ITU-R BT.709 or ITU-R BT.601 primaries). In bypass mode, no compression is performed if the display gamut is not determined to be sufficiently narrower than the source gamut.

Gamut compression architecture 148 includes source-target gamut analysis logic circuitry 146, which receives both source gamut information 108 associated with the source image 105 (e.g., associated input pixel values 106), and display gamut information 109 associated with an output display (or any other output destination). Source gamut information 108 includes input pixel xy chromaticity values for its color primaries (i.e. where the value in one color channel is 1 in a normalized 0-1 range, and others are 0). In exemplary embodiments, where an input image includes either xvYCC or sRGB data, source gamut information 108 includes primary chromaticity values $x_{r_{sRGB}}$, $y_{r_{sRGB}}$, $x_{g_{sRGB}}$, $y_{g_{sRGB}}$, and $x_{b_{sRGB}}$, $y_{b_{sRGB}}$, (as both xvYCC and sRGB data use the ITU-R BT.709 primaries). Display gamut information 109 includes primary chromaticity values $x_{r_{out}}$, $y_{r_{out}}$, $x_{g_{out}}$, $y_{g_{out}}$, and $x_{b_{out}}$, $y_{b_{out}}$ supported by a display (e.g., display 153). In the exemplary embodiment, gamut information 109 is passed to source-target gamut analysis module 146 from a device operating system (OS) 125 via a graphics driver. Source-target gamut analysis logic circuitry 146 is configured to assess differences between the source and display gamuts, and to provide compression parameters employed by gamut compression circuitry 147 based on the source and output gamut differences.

Gamut compression architecture 148 further includes gamut compression circuitry 147, which receives the input pixel values 106, and scales the values as needed to output gamut compressed pixel values 190. Gamut compression circuitry 147 is coupled to source-target gamut analysis logic circuitry 146 and further interfaces with application 126, for example through a graphics driver. Either or both source-target gamut analysis logic circuitry 146 and application 126 control the pixel value mapping performed by gamut compression circuitry 147. In the exemplary embodiment, parameters specifying a mapping mode 111 are passed to gamut compression circuitry 147. Compression parameters 112, determined based on the source and display gamut information (e.g., similarity flag $S_{\Delta rgb_{sRGB}-\Delta rgb_{out}}$, gamut area ratio $AR_{\Delta rgb_{sRGB}-\Delta rgb_{out}}$ described below), are also passed to gamut compression circuitry 147 to control the compression output.

Figure 2:
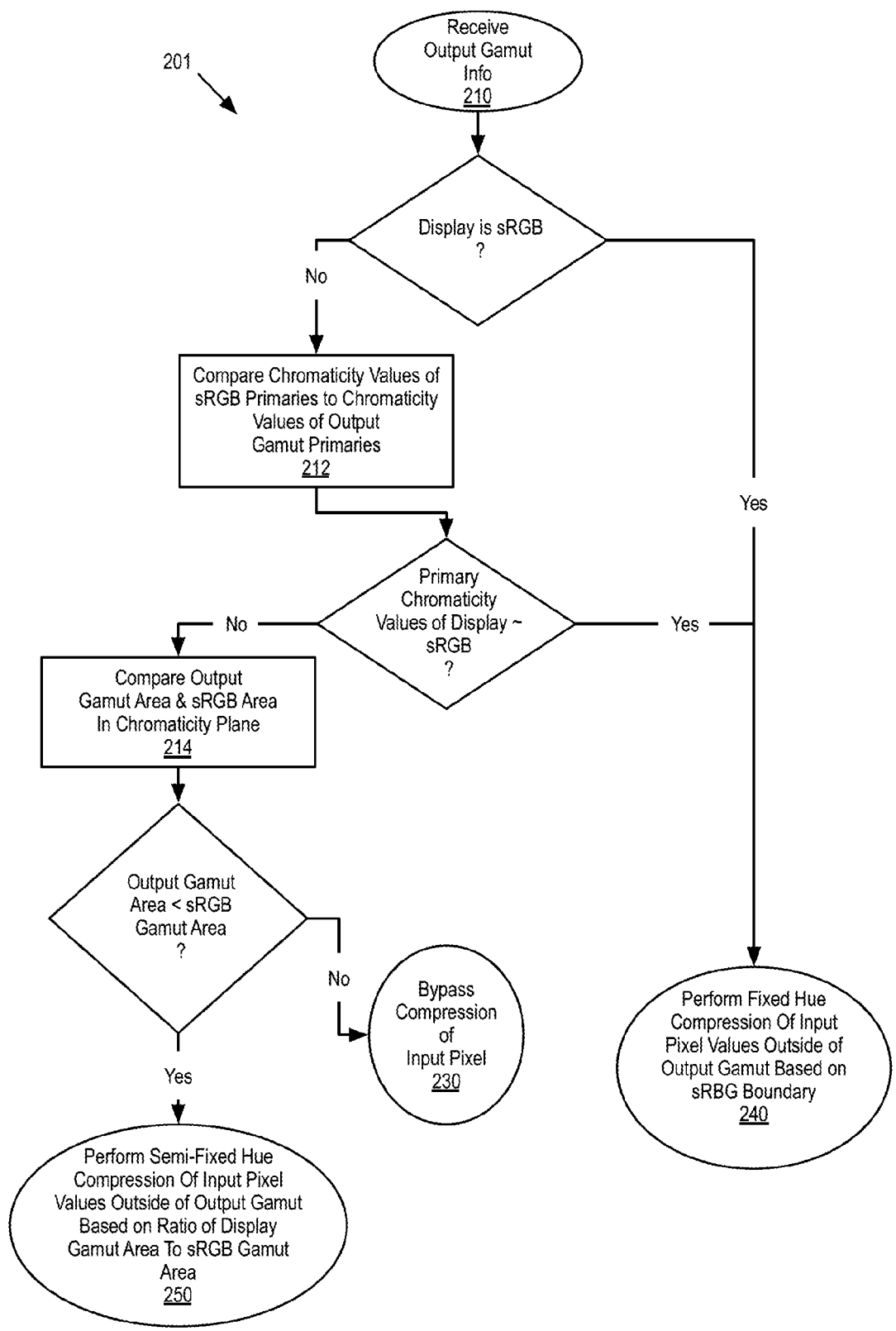
FIG. 2 is a flow diagram illustrating a method of multi-mode, adaptive gamut compression, in accordance with an embodiment.

FIG. 2 is a flow diagram illustrating a multi-mode, adaptive gamut compression method 201, in accordance with an embodiment. Method 201 is performed by gamut compression architecture 148 in an exemplary embodiment.

Method 201 begins at operation 210 with receipt or determination of the display gamut information (e.g., display gamut information 109 in FIG. 1B). For embodiments where the display gamut information indicates the display is sRGB, method 201 proceeds to operation 240 where compression circuitry 147 (FIG. 1B) performs fixed-hue gamut compression operation 240. As described further below, During operation 240, a given input pixel value is determined to be within or outside of the sRGB gamut based on the well-defined RGB boundary for each hue angle. Compression is then performed as needed on a per-pixel basis. In alternate embodiments, where the display gamut information potentially indicates the output display lacks a fully-defined 3D color space, method 201 proceeds to analyze the narrow gamut color space primary chromaticity coordinates.

At operation 212, primary chromaticity values of the display gamut are compared to corresponding primary chromaticity values for a reference sRGB gamut. A similarity of primary chromaticity between the display gamut and the reference gamut is quantified and may be assigned to a similarity flag. In the exemplary embodiment, $S_{\Delta rgb_{sRGB}-\Delta rgb_{out}}$ is a similarity flag indicating if the triangle enclosed by the RGB primaries of the display ($\Delta rgb_{out}$) has a predetermined threshold of similarity to the triangle enclosed by RGB primaries ($\Delta rgb_{sRGB}$) within the xy chromaticity plane. Noting the primary chromaticity values have error associated with their floating point representations, the similarity flag is to discern whether $x_{r_{out}} \sim x_{r_{sRGB}}$, $y_{r_{out}} \sim y_{r_{sRGB}}$; $x_{g_{out}} \sim x_{g_{sRGB}}$, $y_{g_{out}} \sim y_{g_{sRGB}}$; and $x_{b_{out}} \sim x_{b_{sRGB}}$, $y_{b_{out}} \sim y_{b_{sRGB}}$. In one exemplary embodiment, similarity flag $S_{\Delta rgb_{sRGB}-\Delta rgb_{out}}$ is determined from the function:

$$S_{\Delta rgb_{sRGB}-\Delta rgb_{out}} = \begin{cases} 1, & \text{if } [(|x_{j_{sRGB}} - x_{j_{out}}| < 0.05 x_{j_{sRGB}}) \& \\ & (|y_{j_{sRGB}} - y_{j_{out}}| < 0.05 y_{j_{sRGB}})], j \in (r, g, b) \\ -1, & \text{otherwise} \end{cases} \quad (1)$$

Although 0.05 has been found to be an advantageous similarity threshold, this value may be varied and may be made a parameter configurable through a graphics driver, etc. Other mathematical functions that achieve a similar objective may be utilized in the alternative to assess a display's primary chromaticity similarity to sRGB, or any other fully-defined reference color space.

Figure 7A:
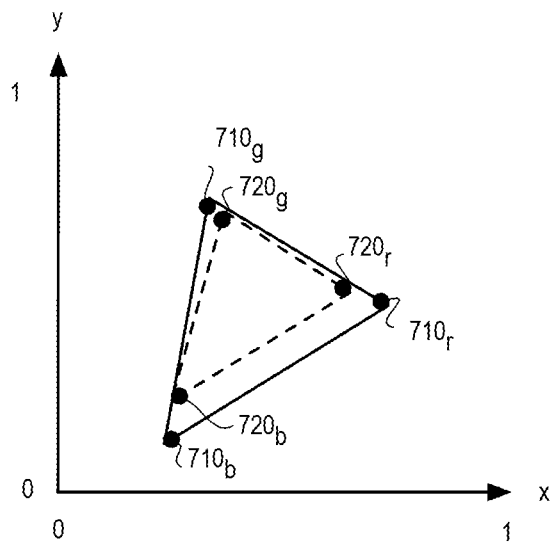
FIGS. 7A, 7B illustrate chromaticity values of sRGB primaries compared to those of a narrower gamut display, in accordance with embodiments.

FIG. 7A illustrates sRGB primaries $710_r$, $710_b$, $710_g$ within the xy chromaticity plane compared to a narrower gamut display having primaries $720_r$, $720_b$, $720_g$. A comparison of $710_r$, $710_b$, $710_g$ to $720_r$, $720_b$, $720_g$ using equation (1) generates a similarity flag $S_{\Delta rgb_{sRGB}-\Delta rgb_{out}}=1$, indicating the display color gamut is reasonably well approximated by the sRGB color gamut, and returning to FIG. 2, method 201 proceeds again to fixed-hue color compression operation 240.

Figure 7B:
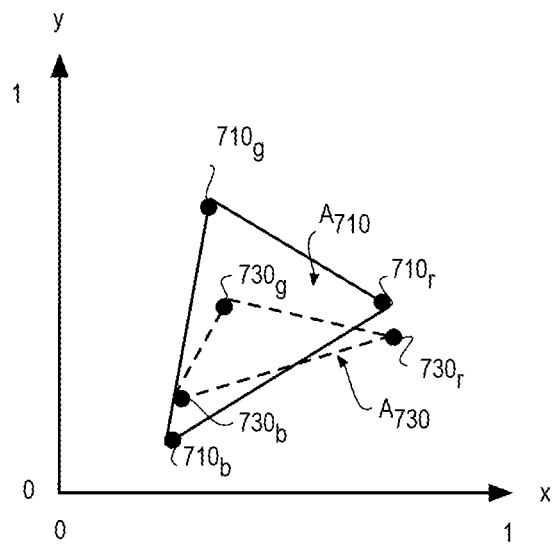

FIG. 7B illustrates sRGB primaries $710_r$, $710_b$, $710_g$ within the xy chromaticity plane compared to those of a narrow gamut display having primaries $730_r$, $730_b$, $730_g$. In FIG. 7B, the display gamut has one or more primary chromaticity value that is significantly (e.g., more than 5%) less than that of sRGB, and the comparison operation 212 using equation (1) generates a similarity flag $S_{\Delta rgb_{sRGB}-\Delta rgb_{out}}=1$, indicating the display is not well-approximated as sRGB. Returning to FIG. 2, method 201 in this circumstance continues at operation 214 where the display gamut area defined by the chromaticity values of the primaries is compared to the corresponding reference gamut area. In one such embodiment, a gamut area ratio $AR_{\Delta rgb_{sRGB}-\Delta rgb_{out}}$ is determined as:

$$AR_{\Delta rgb_{sRGB}-\Delta rgb_{out}} = \frac{A_{\Delta rgb_{out}}}{A_{\Delta rgb_{sRGB}}} \quad (2)$$

Areas of the sRGB reference gamut and the display gamut are further illustrated in FIG. 7B as areas $A_{710}$ and $A_{730}$, respectively, which result in an $AR_{\Delta rgb_{sRGB}-\Delta rgb_{out}}$ of for example.

Method 201 (FIG. 2) proceeds to bypass compression at operation 230, or perform semi-fixed hue compression at operation 250, based on the gamut area ratio (e.g., $AR_{\Delta rgb_{sRGB}-\Delta rgb_{out}}$) and the similarity flag (e.g., $S_{\Delta rgb_{sRGB}-\Delta rgb_{out}}$). In the exemplary embodiment, if the primary chromaticity values of the display are sufficiently dissimilar (i.e., fails to satisfy a similarity threshold) to those of the sRGB gamut (e.g., $S_{\Delta rgb_{sRGB}-\Delta rgb_{out}}=1$), and the display gamut area is smaller than the sRGB gamut area by a predetermined threshold (e.g., $AR_{\Delta rgb_{sRGB}-\Delta rgb_{out}}<0.95$), then a compression flag is set (e.g., compression=1). Setting the compression flag to 1 for example, sets gamut compression circuitry 147 (FIG. 1B) to an "on" state. Compression circuitry 147 then performs semi-fixed-hue compression operation 250. For the exemplary narrow gamut illustrated in FIG. 7B, the above conditions are both met and method 201 includes performance of semi-fixed-hue compression operation 250, executed for example by gamut compression circuitry 147.

For embodiments where neither the predetermined similarity threshold (e.g., for the exemplary narrow gamut illustrated in FIG. 7A), nor the predetermined area ratio threshold is satisfied, the compression flag is reset (e.g., compression=0). A compression flag equal to 0 for example, may place gamut compression circuitry 147 into "bypass" mode with method 201 then ending at operation 230 where input pixel values are passed uncompressed (e.g., $u_{p_i,out}=u_{p_i,in}$, $v_{p_i,out}=v_{p_i,in}$, $y_{p_i,out}=y_{p_i,in}$).

Figure 3:
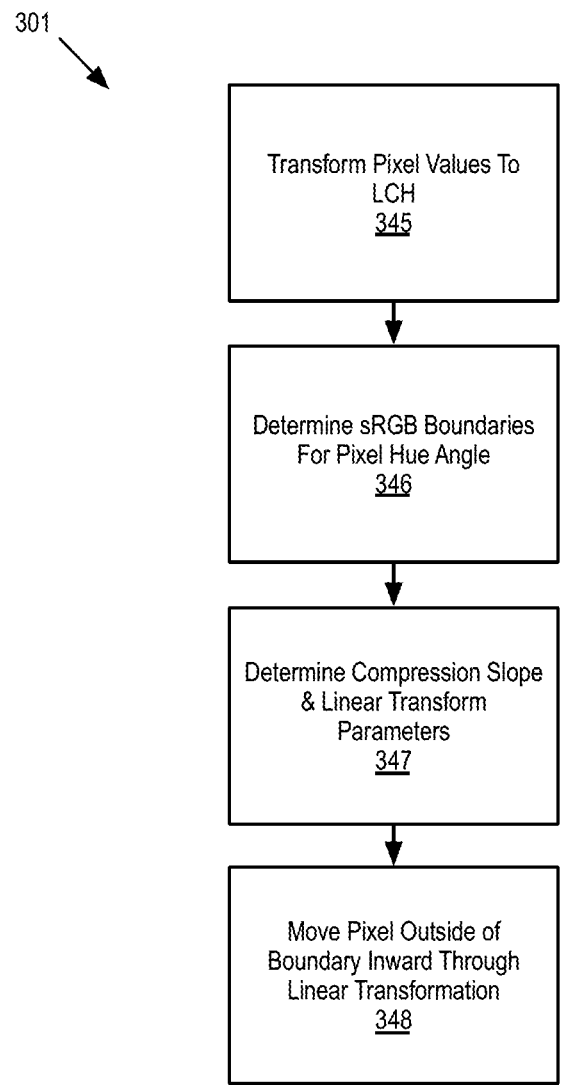
FIG. 3 is a flow diagram illustrating a fixed-hue color gamut compression method, which may be performed as part of the method illustrated in FIG. 2 in accordance with an embodiment.

FIG. 3 is a flow diagram illustrating a fixed-hue gamut compression method 301, which is performed by gamut compression circuitry 147 as part of operation 240, in accordance with an exemplary embodiment.

As noted above, fixed-hue gamut compression may be utilized where the output display gamut is sRGB. The inventors have found that fixed-hue gamut compression embodiments can mitigate loss of image detail in an sRGB display of a source image that utilizes extended-gamut YCC, or xvYCC, color space. Method 301 begins at operation 345 where input image pixel values are transformed into Lightness-Chroma-Hue (LCH) space wherein the transformation from normalized, linear yuv to LCH is:

$$L = y \quad (3)$$

$$C = \sqrt{u^2 + v^2} \quad (4)$$

$$H = \tan^{-1}\frac{v}{u} \quad (5)$$

Figure 8:
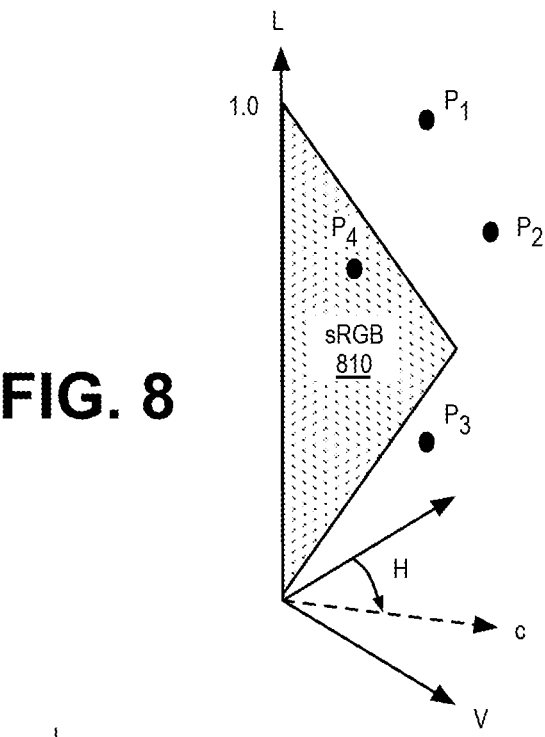
FIG. 8 illustrates an sRGB boundary from a given hue value, in accordance with an embodiment.
Figure 9:
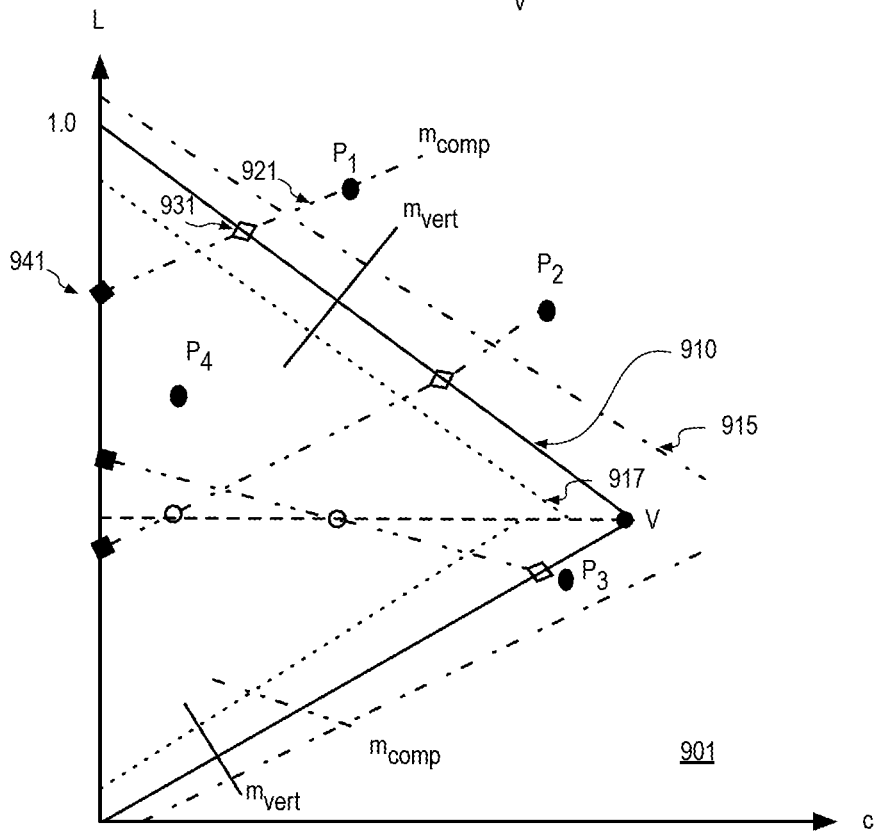
FIG. 9 illustrates the sRGB boundary depicted in FIG. 8 projected on the lightness-chroma (k) plane, with lines of compression shown for certain input pixel values, in accordance with an embodiment.

Method 301 continues with determining sRGB boundaries for a pixel hue angle at operation 346. For any given hue angle H, a hue plane can be drawn through the Y axis which is vertical to the UV plane and is inclined at angle H to the V axis. The intersection of this plane with the sRGB volume forms a region that delimits an RGB boundary corresponding with H. Letting $p_i$ be an input pixel represented in LCH space by an input pixel chroma $c_{p_i}$ and input pixel lightness $l_{p_i}$, an sRGB boundary 810 corresponding to $H_{p_i}$ is shown in FIG. 8, where $H_{p_1}=H_{p_2}=H_{p_3}=H_{p_4}$. FIG. 9 illustrates an (lc) plane 901 with an sRGB boundary projection 910 corresponding to RGB boundary 810 illustrated in FIG. 8.

Returning to FIG. 3, a compression slope and linear transform parameters that will map an out-of-range pixel (and any near boundary pixel depending on mapping mode) inwards into range of the smaller sRGB gamut are determined at operation 347. Method 301 then completes at operation 348 with moving, or compressing, the out-of-range pixel inwards by the linear transformation along the compression line, and over the compression distance determined at operation 347.

Figure 4:
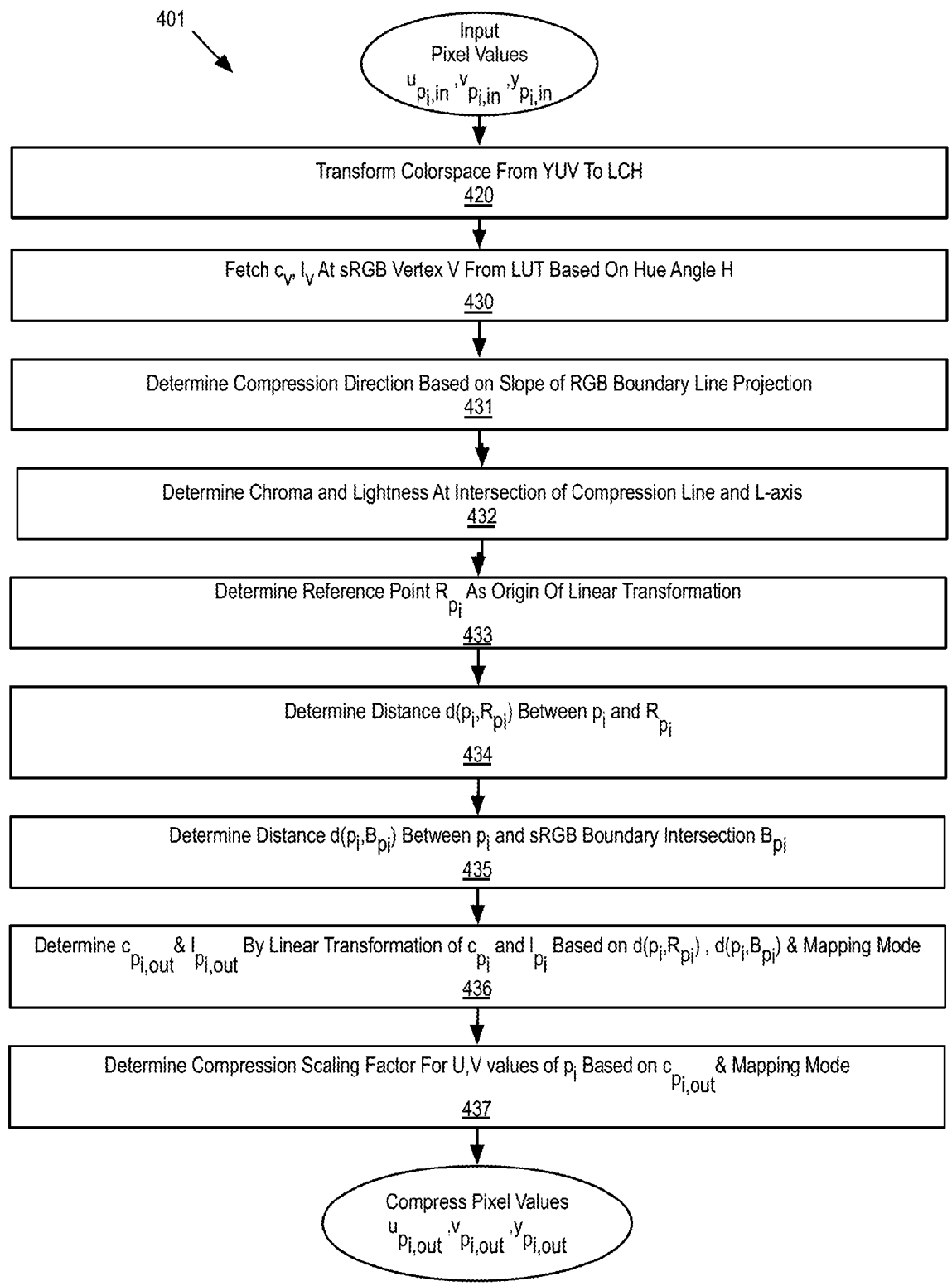
FIG. 4 is a flow diagram further illustrating a fixed-hue gamut compression method, which may be performed as part of the method illustrated in FIG. 2 in accordance with an embodiment.

FIG. 4, is a flow diagram further illustrating a fixed hue gamut compression method 401, in accordance with an exemplary embodiment. Method 401 is an exemplary implementation of method 301, and further describes embodiments of fixed-hue color mapping and transformation operations introduced above.

Method 401 begins with receiving input pixel values $u_{p_i,in}$, $y_{p_i,in}$. At operation 420, the YUV values are transformed to LCH space as described above. At operation 430 lightness and chroma values for vertex V (illustrated in FIG. 9) of the projected RGB boundary plane are determined based on the known hue angle H. In the exemplary embodiment, chroma at vertex V ($c_v$) and lightness at vertex V ($l_v$) are fetched from a preconstructed lookup table (LUT). Indexing the LUT by H, the fetch returns:

$$V=(c_v,l_v) \quad (6)$$

At operation 431, the direction for compressing out-of-range pixels in a hue plane is determined based on slope of the sRGB boundary line projection. Compression line slope $m_{comp}$ (illustrated in FIG. 9) may be expressed as:

$$m_{comp}=k \times m_{vert} \quad (7)$$

where k is a tuning constant, which may be configurable through the graphics driver. Constant k is advantageously less than 1 to limit changes in luminance Y, and greater than 0 to avoid compressed color from becoming to pale. In an exemplary embodiment k~⅛.

In equation (7), m is the slope of a line perpendicular to the sRGB boundary line projection:

$$m_{vert} = -\frac{1}{m_{boundary}}, \text{ and} \quad (8)$$

$$m_{boundary} = \frac{(l_v - e_v)}{c_v}, \text{ where} \quad (9)$$

$e_v = 1$, if $l_{pi} > l_v$; else 0

Equations (8) and (9) accommodate top and bottom sRGB boundary lines forming vertex V on the LC plane, as further illustrated in FIG. 9.

Continuing with method 401, at operation 432, chroma and lightness at the intersection of the compression line and L-axis are determined. This intersection may be expressed as:

$$I_{p_i} = (c_{I_{p_i}}, l_{I_{p_i}}) = (0, l_{p_i} - c_{p_i} \times m_{comp}) \quad (10)$$

At operation 433, a reference point $$R_{p_i} = (c_{R_{p_i}}, l_{R_{p_i}})$$

is determined, which will serve as the origin of the linear transformation for compressing pixel $p_i$, where $$l_{R_{p_i}} = \max(l_{I_{p_i}}, l_v) \text{ if } l_{p_i} > l_v; \text{ otherwise } \min(l_{I_{p_i}}, l_v), \text{ and} \quad (11)$$

$$c_{R_{p_i}} = (l_{R_{p_i}} - l_{I_{p_i}}) \times \frac{1}{m_{comp}}. \quad (12)$$

A point nearest the input pixel $p_i$ on the sRGB boundary line projection along the compression direction is further determined. This intersection between the compression line and the RGB boundary line projection may be expressed as:

$$B_{P_i} = (c_{B_{P_i}}, l_{B_{P_i}}), \text{ where} \quad (13)$$

$$c_{B_{P_i}} = \frac{(l_{I_{p_i}} - e_v)}{(m_{boundary} - m_{comp})}, \text{ and} \quad (14)$$

$$l_{B_{P_i}} = c_{B_{P_i}} \times m_{boundary} + e_v. \quad (15)$$

In FIG. 9, compression line 921 for pixel $p_1$ is illustrated with an L-axis intersection 941, which is also the reference point $R_{p_1}$. An sRGB boundary intersection 931 is also depicted in FIG. 9.

Returning to FIG. 4, at operation 434 the distance between pixel $p_i$ and the reference point $R_{p_i}$ is determined. The linear transformation to compress out-of-range pixels is dependent on this distance between the input pixel and the corresponding reference point $d(p_i, R_{p_i})$. The linear transformation is also dependent on the distance between the input pixel and the nearest boundary point $d(p_i, B_{p_i})$, which is also determined at operation 435.

At operation 436, chroma and lightness of the input pixel is mapped to an output pixel chroma and lightness through linear transformation based on the distances $d(p_i, B_{P_i})$ and $d(p_i, R_{p_i})$, and based on the mapping mode. The transformed lightness may be determined from the transformed chroma value, following:

$$l_{p_i, output} = l_{I_{p_i}} + c_{p_i, output} \times m_{comp} \quad (16)$$

For embodiments operating in the relative colorimetric mapping mode, where out-of-gamut colors are to be projected to the gamut surface with no mapping of in-gamut colors, the transformed chroma value is set equal to the chroma value at the boundary intersection point:

$$c_{p_i, output} = c_{B_{p_i}} \quad (17)$$

in response to the distance between the input pixel and the reference point $d(p_i, R_{p_i})$ being larger than the distance between the reference point and the sRGB boundary intersection point $d(R_{p_i}, B_{p_i})$. In this mode therefore, each of the input pixels $p_1$, $p_2$, and $p_3$ depicted in FIG. 9 is moved along the compression line to the sRGB boundary intersection with any luminance variation beyond this boundary being lost.

For embodiments operating in the perceptual mapping mode, where all source colors are smoothly mapped into the target gamut with those outside of the output gamut moving relatively more than those inside, the transformed chroma value is determined based on an internal and external line of compression. These lines are parallel to the sRGB boundary with the external line being farther from the reference point $R_{p_i}$ than is the sRGB boundary and the internal line being near to the reference point $R_{p_i}$ than is the sRGB boundary. FIG. 9 illustrates an exemplary external compression line 915 and internal compression line 917. For perceptual mode embodiments, the external line 915 is mapped to the boundary line 910 while the boundary line 910 is mapped to the internal line 917, enabling smoother mapping results. In perceptual mode, the transformed chroma value may be expressed as:

$$c_{p_i, output} = c_{R_{p_i}} + (c_{p_i} - c_{R_{p_i}}) \times \frac{d_{p_i, final}}{d(R_{p_i}, p_i)}, \text{ where} \quad (18)$$

$$d_{p_i, final} = \quad (19)$$

$$d_{p_i, inner} + [d(R_{p_i}, p_i) - d_{p_i, inner}] \times \frac{[d(R_{p_i}, B_{p_i}) - d_{p_i, inner}]}{[d_{p_i, outer} - d_{p_i, inner}]},$$

if $d(R_{p_i}, p_i) > d_{p_i, inner}$; otherwise:

$$d_{p_i, final} = d(R_{p_i}, p_i). \quad (20)$$

For equation (19), $$d_{p_i, inner} = \max(d(R_{p_i}, p_i) - d_{in}, 0), \text{ and} \quad (21)$$

$$d_{p_i, outer} = (R_{p_i}, B_{p_i}) + d_{out}, \quad (22)$$

where $d_{in}$ is the internal line of compression and $d_{out}$ is the external line of compression, which depend on the input pixel value:

$$d_{in/out} = d_{in/out, default}, \text{ if } l_{p_i} > l_v; \text{ otherwise} \quad (23)$$

$$d_{in/out} = \max(d_{in/out, default}, d_{in/out, change}), \text{ where} \quad (24)$$

$$d_{in/out, change} = d_{in/out}^1 + \frac{d_{in/out, default} - d_{in/out}^1}{l_v} \times c_{B_{p_i}}. \quad (25)$$

Here $d_{in}^1$, $d_{out}^1$, $d_{in, default}$, $d_{out, default}$ are parameters that control the level of compression, and are configurable through a graphics driver in the exemplary embodiment.

Method 401 then proceeds to operation 437 where the UV compression scaling factor $sf_{p_i}$ is determined for U,V values of the input pixel $p_i$ based on the mapped chroma values, and further based on the mapping mode. For embodiments utilizing perceptual mode or relative mode:

$$sf_{p_i} = \frac{c_{p_i, output}}{c_{p_i}}; \quad (26)$$

otherwise:

$$sf_{p_i} = sf_{global}, \quad (27)$$

which enables the saturation mode where the relative saturation values of all colors are maintained through a scaling by a predetermined global scaling factor. In an exemplary embodiment, $sf_{global}$ is configurable through a graphics driver.

Method 401 then completes with compressing the value of the input pixel $p_i$ as:

$$u_{p_i,out}=u_{p_i,in}; v_{p_i,out}=v_{p_i,in}; y_{p_i,out}=y_{p_i,in} \text{ if } c_{p_i}=0, \text{else} \quad (28)$$

$$u_{p_i,out}=u_{p_i,in} \times sf_{p_i}; v_{p_i,out}=v_{p_i,in} \times sf_{p_i}; y_{p_i,out}=l_{p_i,output}. \quad (29)$$

Figure 5:
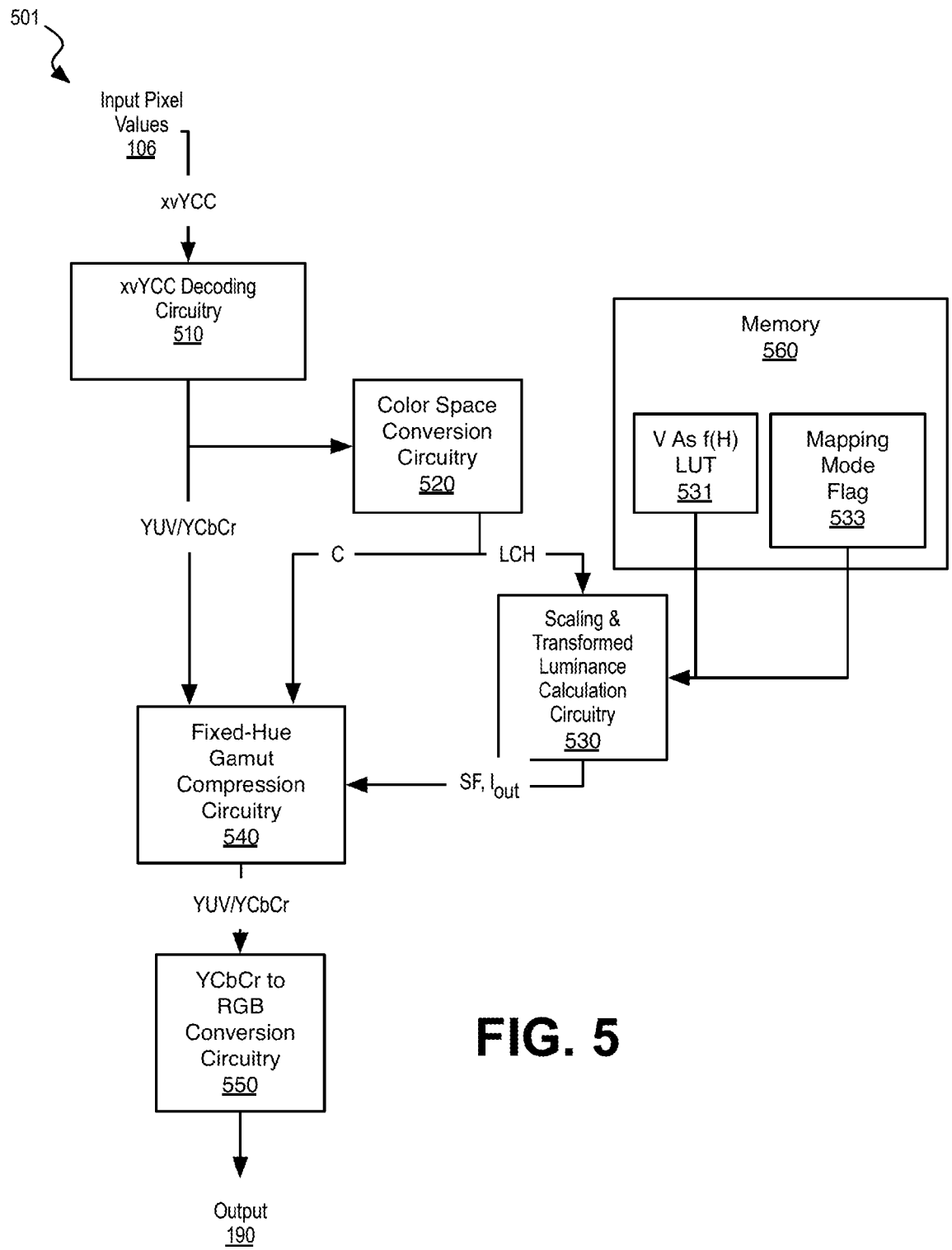
FIG. 5 is a functional block diagram of a fixed-hue gamut compression architecture, which may be employed by the gamut compression circuitry depicted in FIG. 1B to perform the method illustrated in FIG. 3 and/or FIG. 4, in accordance with embodiments.

FIG. 5 is a functional block diagram of a fixed-hue gamut compression architecture 501, which is employed by the gamut compression circuitry 147 (FIG. 1B) to perform the method 401 (FIG. 4), in accordance with one exemplary embodiment. Input values 108 in xvYCC format are received by xvYCC decoding circuitry 510, which outputs pixel values in YUV/YCbCr format. Decoding circuitry 510 may employ one of several possible 3×3 matrices for conversion from RGB to YUV, the two most common being defined in BT 709 and BT 601, often used for HD and SD TV, respectively.

Color space conversion circuitry 520, coupled to an output of xvYCC decoding circuitry 510, performs the YUV to LCH conversion operation on the YUV/YCbCr format pixel values. Scaling and transformed luminance calculation circuitry 530, coupled to an output of color space conversion circuitry 520 and in or more memory 560, fetches chroma and lightness values for the sRGB boundary projection vertex V based on hue angle H, from lookup table 531. Scaling and transformed luminance calculation circuitry 530 further determines the sRGB boundaries, compression slope and linear transform parameters as a function of the mapping mode flag 533 stored in memory 560. Fixed-hue gamut compression circuitry 540 is coupled to outputs of xvYCC decoding circuitry 510, color space conversion circuitry 520, and scaling and transformed luminance calculation circuitry 530. Fixed-hue gamut compression circuitry 540 receives input pixel chroma $c_{p_i}$ from color space conversion circuitry 520. Fixed-hue gamut compression circuitry 540 further receives input pixel UV compression scaling factor $sf_{p_i}$ and transformed luminance $l_{p_i,output}$ from scaling and transformed luminance calculation circuitry 530. Fixed-hue gamut compression circuitry 540 performs the scaling math (e.g., with one or more multiplier) on the YUV/YCbCr format pixel values output by xvYCC decoding circuitry 510 based on $sf_{p_i}$ and $l_{p_i,output}$. YCbCr to RGB conversion circuitry 550, coupled to an output of fixed-hue gamut compression circuitry 540, converts compressed values of input pixel values 106 to RGB, for example using an inverse of a 3×3 RGB to YUV conversion matrix.

Figure 6:
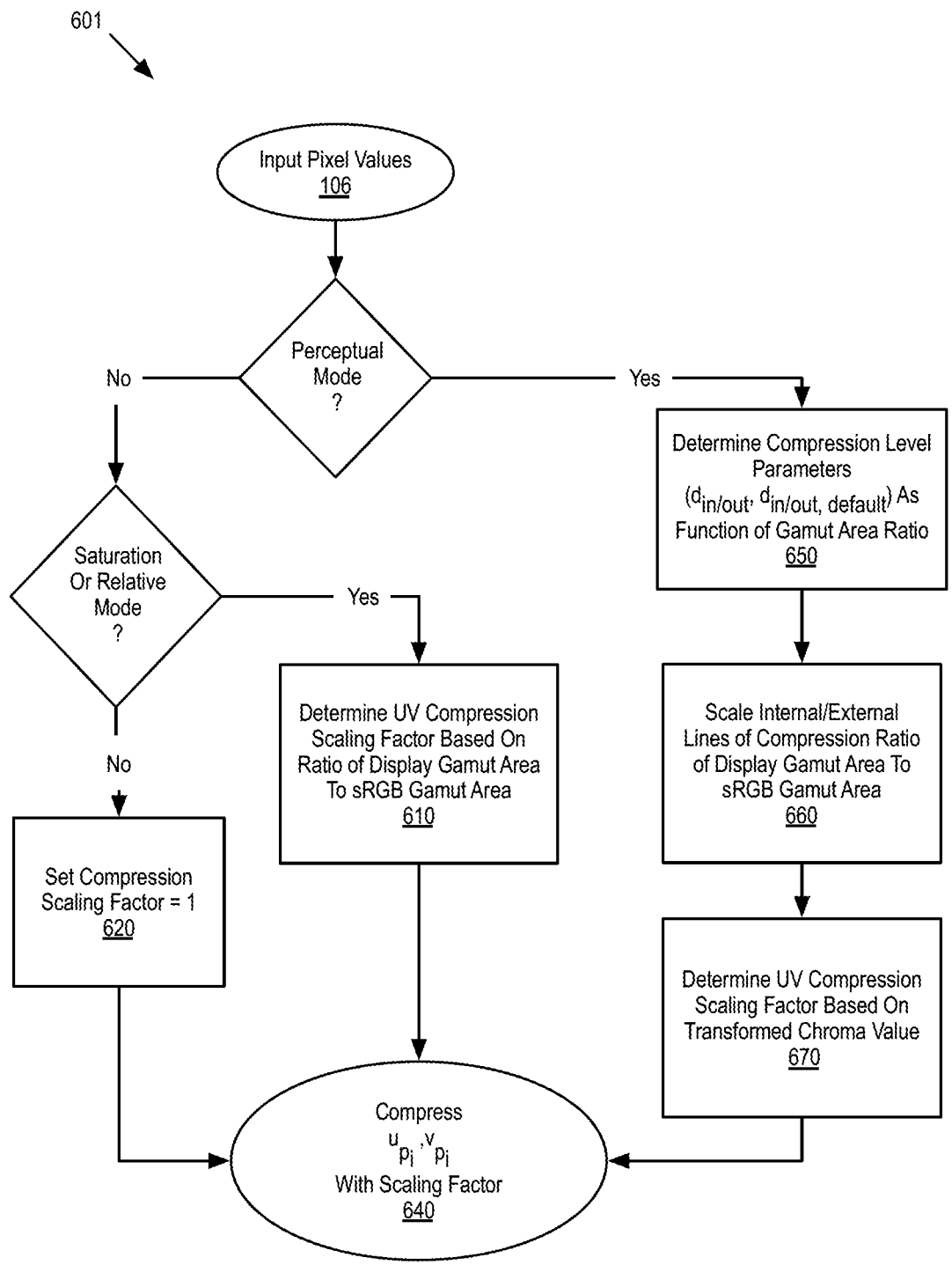
FIG. 6 is a flow diagram illustrating a semi-fixed-hue gamut compression method, which may be performed as part of the method illustrated in FIG. 2 in accordance with an embodiment.

FIG. 6 is a flow diagram illustrating a semi-fixed-hue gamut compression method 601, which is performed by source-target gamut analysis circuitry 146 (FIG. 1B) as part operation 250 of method 201 (FIG. 2), in accordance with an embodiment.

Method 601 begins with receiving input pixel values 106 and an indication of the mapping mode. In embodiments where gamut compression module 145 (FIG. 1A) is neither in perceptual mode, nor saturation or relative mode, method 601 proceeds to operation 620 where the UV compression scaling factor $sf_{p_i}$ is set to 1. Source-target gamut analysis circuitry 146 (FIG. 1B) passes $sf_{p_i}=1$ to gamut compression circuitry 147, and fixed-hue gamut compression circuitry 540 (FIG. 5) scales the input pixel values by 1 (i.e., no compression), completing method 601 at operation 640.

In embodiments where gamut compression module 145 (FIG. 1A) is in saturation or relative mapping mode, method 601 (FIG. 6) proceeds to operation 610 where UV compression scaling factor $sf_{p_i}$ is determined based on the display gamut area to sRGB gamut area ratio $AR_{\Delta rgb_{sRGB}-\Delta rgb_{out}}$ from equation (2). Noting that method 601 is performed only if the compression flag has been properly set in method 201, $sf_{p_i}$ may be expressed as:

$$sf_{p_i}=AR_{\Delta rgb_{sRGB}-\Delta rgb_{out}}, \text{ if } (compress_{flag}=1) \, \& \, (mode=saturation|relative); \quad (30)$$

Source-target gamut analysis circuitry 146 (FIG. 1B) passes $sf_{p_i}=AR_{\Delta rgb_{sRGB}-\Delta rgb_{out}}$ to gamut compression circuitry 147, and fixed-hue gamut compression circuitry 540 (FIG. 5) scales the U,V input pixel values by $AR_{\Delta rgb_{sRGB}-\Delta rgb_{out}}$ to complete method 601 at operation 640. For such embodiments, color compression is performed without fixing hue.

In embodiments where gamut compression module 145 (FIG. 1A) is in perceptual mode, compression scaling factor $sf_{p_i}$ is determined by the fixed-hue gamut compression method, but with the compression level parameters $d_{in}^1$, $d_{out}^1$, $d_{in,default}$, $d_{out,default}$ introduced above being functions of $AR_{\Delta rgb_{sRGB}-\Delta rgb_{out}}$, as opposed to being constants. Source-target gamut analysis circuitry 146 (FIG. 1B) may pass $d_{in}^1$, $d_{out}^1$, $d_{in,default}$, $d_{out,default}$ determined based on $AR_{\Delta rgb_{sRGB}-\Delta rgb_{out}}$ to fixed-hue gamut compression circuitry 540. Noting that method 601 is performed only if the compression flag has been properly set in method 201, $sf_{p_i}$ may be further expressed as:

$$sf_{p_i}=f(d_{in},d_{out}), \text{ if } (compress_{flag}=1) \, \& \, (mode=perceptual), \text{ where} \quad (31)$$

$f(d_{in}, d_{out})$ is a function dependent on $d_{in}$, $d_{out}$ introduced in equations (21) and (22). Compression level parameters $d_{in}^1$, $d_{out}^1$, $d_{in,default}$, $d_{out,default}$ are determined at operation 650 as functions proportional to $AR_{\Delta rgb_{sRGB}-\Delta rgb_{out}}$. At operation 660, the $d_{in/out}$ lines are scaled, or moved relative to their default fixed values at as a function of how much smaller the display gamut is relative to the sRGB gamut. For example, where $AR_{\Delta rgb_{sRGB}-\Delta rgb_{out}}$ is 0.55, $d_{in/out}$ lines are move inward by an greater amount than if $AR_{\Delta rgb_{sRGB}-\Delta rgb_{out}}$ is 0.9. Fixed-hue gamut compression circuitry 540 (FIG. 5) may then complete the method 601 (FIG. 6) by proceeding to determine the UV compression scaling factor $sf_{p_i}$ at operation 670 substantially as described above in equations (3)-(25). U,V input pixel values are then scaled at operation 640 following equation (26) to complete method 601. In further embodiments, input pixel Y values may be scaled as well, for example as described above in reference to equation (16).

Figure 10:
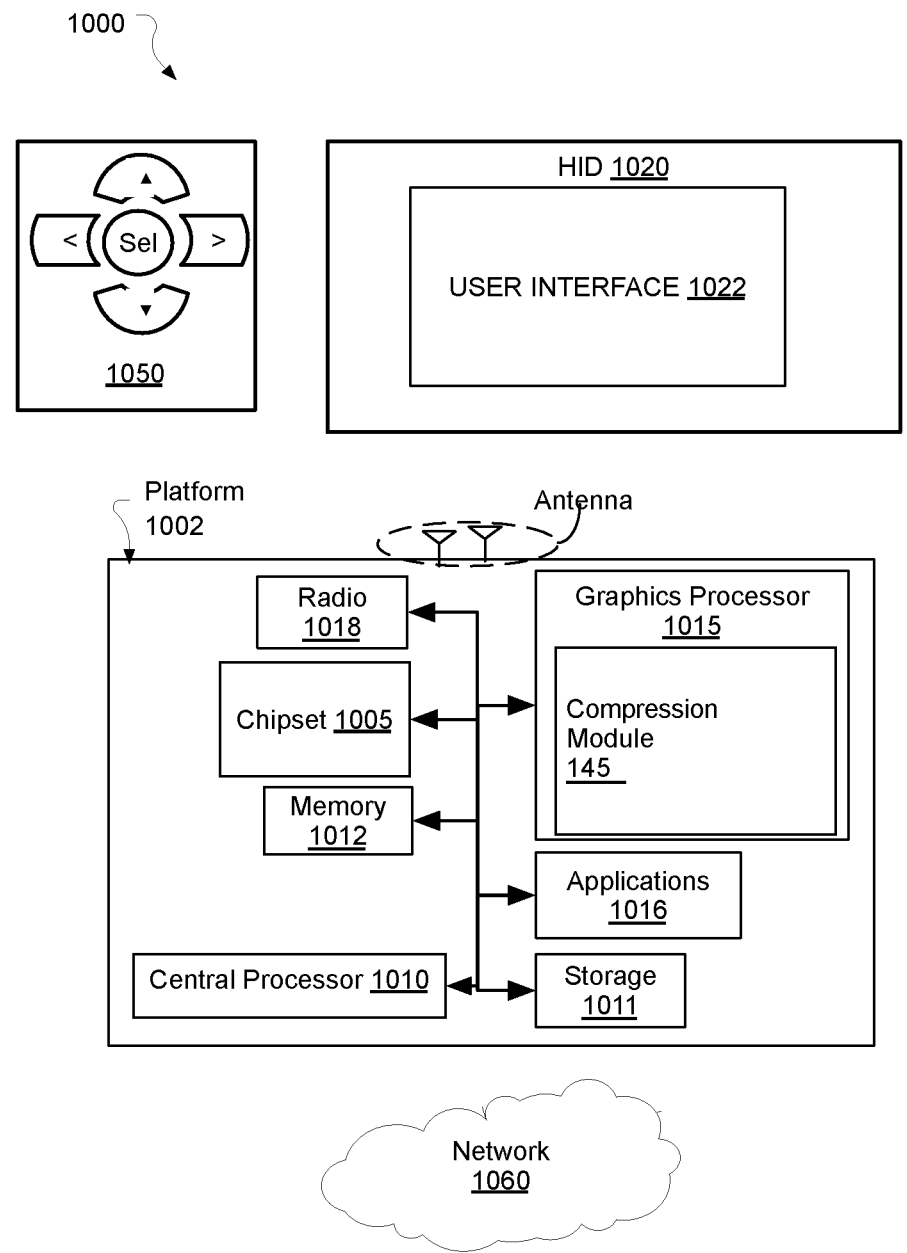
FIG. 10 is a diagram of an exemplary system, in accordance with an embodiment.

FIG. 10 is an illustrative diagram of an exemplary system 1000, in accordance with embodiments. System 1000 may implement all or a subset of the various functional blocks depicted in FIGS. 1A, 1B, and 4. For example, in one embodiment a graphics processor 1015 implements a graphics processing system that includes the compression module 145 as was introduced in FIG. 1A, for example having one or more of the features described elsewhere herein to perform any of the methods described in the context of FIG. 2, 3, 4, or 6. In one specific exemplary embodiment, graphics processor 1015 includes fixed-function and/or programmable logic circuitry within at least one execution unit (EU), or shader core, to perform adaptive gamut compression of input video in response to differences between the source gamut and output display gamut. System 1000 may be a mobile device although system 1000 is not limited to this context. For example, system 1000 may be incorporated into a laptop computer, ultra-laptop computer, tablet, touch pad, portable computer, handheld computer, palmtop computer, cellular telephone, smart device (e.g., smart phone, smart tablet or mobile television), mobile internes device (MID), messaging device, data communication device, and so forth. System 1000 may also be an infrastructure device. For example, system 1000 may be incorporated into a large format television, set-top box, desktop computer, or other home or commercial network device.

In embodiments, system 1000 includes a platform 1002 coupled to a HID 1020. Platform 1002 may receive captured personal media data from a personal media data services device(s) 1030, a personal media data delivery device(s) 1040, or other similar content source. A navigation controller 1050 including one or more navigation features may be used to interact with, for example, platform 1002 and/or HID 1020. Each of these components is described in greater detail below.

In embodiments, platform 1002 may include any combination of a chipset 1005, processor 1010, memory 1012, storage 1014, graphics processor 1015, applications 1016 and/or radio 1018. Chipset 1005 may provide intercommunication among processor 1010, memory 1012, storage 1014, graphics processor 1015, applications 1016, or radio 1018. For example, chipset 1005 may include a storage adapter (not depicted) capable of providing intercommunication with storage 1014.

Processor 1010 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 1010 may be a multi-core processor(s), multi-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1014 may include technology to increase the storage performance enhanced protection for valuable digital media when multiple hard drives are included, for example.

Graphics processor 1015 may perform processing of images such as still or video media data for display, or perform general computing functions in a highly parallel manner. Graphics processor 1015 may include one or more GPU, or visual processing unit (VPU), for example. An analog or digital interface may be used to communicatively couple graphics processor 1015 and display 1020. For example, the interface may be any of a High-Definition Multimedia Interface, Display Port, wireless HDMI, and/or wireless HD compliant techniques. Graphics processor 1015 may be integrated with central processor 1010 onto a single chip (i.e., SoC) as a graphics core or provided as part of chipset 1005. In some implementations, graphics processor 1015 may be a stand-alone card communicatively coupled to chipset 1005. In various exemplary embodiments, graphics processor 1015 and/or central processor 1010 invokes or otherwise implements video enhancement operations including gamut compression. Graphics processor 1015 includes functionality to perform source/output gamut analysis methods upon which fixed and semi-fixed video gamut compression processes may be predicated, for example as described elsewhere herein.

The fixed and semi-fixed-hue gamut compression processes as described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, HID 1020 may include any television type monitor or display. HID 1020 may include, for example, a computer display screen, touch screen display, video monitor, television-like device, and/or a television. HID 1020 may be digital and/or analog. In embodiments, HID 1020 may be a holographic display. Also, HID 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on HID 1020.

In embodiments, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., HID 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or HID 1020. The present disclosure, however, is not limited to the elements or in the context shown or described herein.

In embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 11:
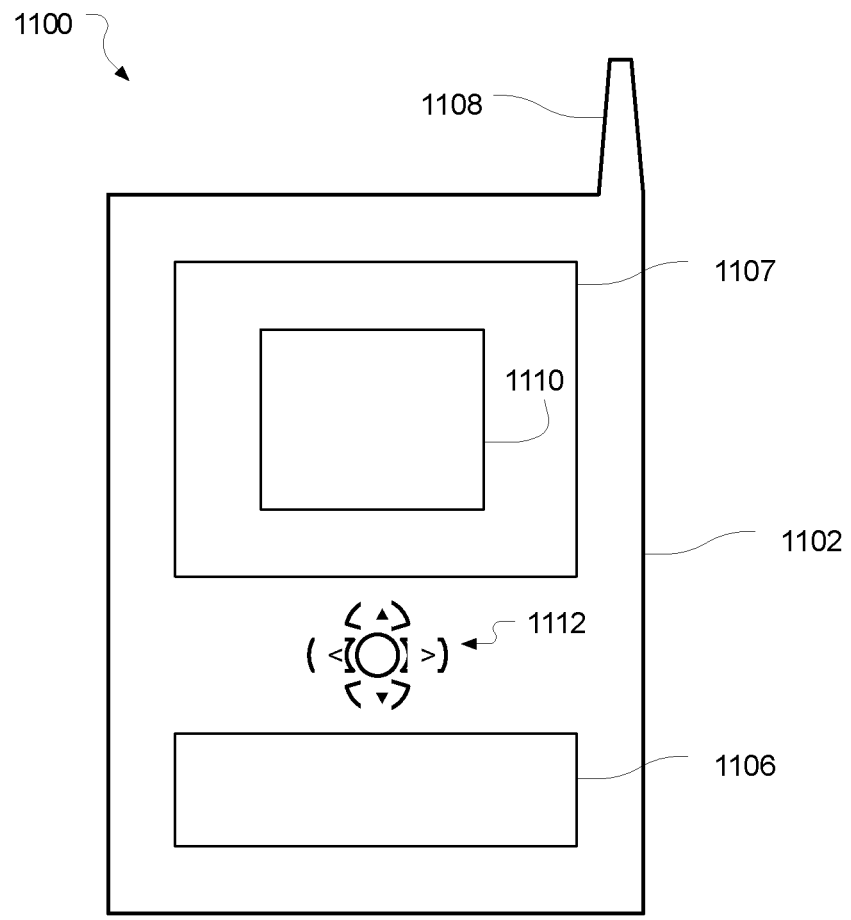
FIG. 11 is a diagram of an exemplary system, arranged in accordance with an embodiment.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1206 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a computer-implemented image processing method includes receiving input image pixel values, determining source gamut information associated with the input image pixel values, and performing a comparison between the sRGB color gamut and an output color gamut associated with an image pixel destination. The method includes adjusting one or more of the input image pixel values by performing a fixed-hue gamut compression or a semi-fixed-hue gamut compression depending upon the comparison and the source gamut information. The method includes storing the color adjusted input image pixel to a memory.

In furtherance of the one or more first embodiment, performing the comparison between the sRGB color gamut and the output color gamut further comprises comparing xy chromaticity values of sRGB primaries to xy chromaticity values of output gamut primaries, and comparing an output gamut area defined by the xy chromaticity values of the output gamut primaries with an sRGB gamut area defined by the xy chromaticity values of the sRGB primaries.

In furtherance of the one or more first embodiment, performing the comparison between the sRGB color gamut and the output color gamut further comprises comparing xy chromaticity values of sRGB primaries to xy chromaticity values of the output gamut primaries, and comparing an output gamut area defined by the xy chromaticity values of the output gamut primaries with an sRGB gamut area defined by the xy chromaticity values of the sRGB primaries. The method further comprises bypassing the gamut compression in response to the xy chromaticity values of the output gamut primaries differing from the xy chromaticity values of sRGB primaries by more than a first predetermined threshold, and the output gamut area failing to be smaller than the sRGB gamut area by a second predetermined threshold.

In furtherance of the one or more first embodiment, performing the comparison between the sRGB color gamut and the output color gamut further comprises: comparing xy chromaticity values of sRGB primaries to xy chromaticity values of the output gamut primaries; and comparing an output gamut area defined by the xy chromaticity values of the output gamut primaries with an sRGB gamut area defined by the xy chromaticity values of the sRGB primaries. The method further comprises performing the semi-fixed-hue gamut compression with a chrominance compression scaling factor determined based on a ratio of the output gamut area and the sRGB gamut area, and based on a mapping mode selectable between a perceptual mode and at least one of a saturation mode and relative colorimetric mode.

In furtherance of the embodiment immediately above, performing the semi-fixed-hue gamut compression further comprises determining a chrominance compression scaling factor based on a ratio of the output gamut area to the sRGB gamut area (AR), and scaling a chrominance value of the input pixels with the chrominance compression scaling factor.

In furtherance of the embodiment immediately above, determining the chrominance compression scaling factor based the AR further comprises setting the chrominance compression scaling factor equal to a function of the AR in response to a selection of the saturation mode or relative colorimetric mode, or determining an inner and outer line of compression within which pixel values are to be compressed based on the AR in response to a selection of the perceptual mode.

In furtherance of the embodiment immediately above, the semi-fixed-hue gamut compression further comprises transforming the input pixel values from luma, chrominance (YUV) space to lightness, chroma, hue (LCH) space, determining an sRGB boundary for a hue angle of an input pixel, determining a compression line slope and linear transform parameters based on the sRGB boundary, and moving a pixel value outside of the sRGB boundary inward based at least on the compression line slope, linear transform parameters, and the inner and outer line of compression.

In furtherance of the one or more first embodiment, the fixed-hue gamut compression further comprises transforming the input pixel values from luma, chrominance (YUV) space to lightness, chroma, hue (LCH) space; determining a chroma and lightness value of a vertex of the sRGB boundary based on a hue angle of the input pixel; determining a compression line intersecting the input pixel L and C values based on a slope of an sRGB boundary line intersecting the vertex; determining a first distance between the input pixel L and C values and corresponding values at an intersection of the compression line and the L-axis; determining a second distance between the input pixel L and C values and corresponding values at an intersection of the compression line and the sRGB boundary; and linearly transforming the input pixel L and C values based on the first and second distances. The linearly transforming further comprises determining an internal line and external line of compression parallel to, and on either side of the sRGB boundary, based on the on the comparison between the sRGB color gamut and the output color gamut. The linearly transforming further comprises moving pixel input values on the sRGB boundary to the internal line of compression. The linearly transforming further comprises moving pixel input values on the external line of compression to the sRGB boundary. The linearly transforming further comprises moving pixel input values on the sRGB boundary to the internal line of compression.

In furtherance of the embodiment immediately above, determining the internal line and external line of compression based on the on the comparison between the sRGB color gamut and the output color gamut further comprises determining default values for the internal and external lines of compression associated with the sRGB gamut, and modifying the default values as a function of a difference between an output gamut area defined by xy chromaticity values of the output gamut primaries, and an sRGB gamut area defined by xy chromaticity values of the sRGB primaries.

In furtherance of the embodiment immediately above, the semi-fixed-hue gamut compression further comprises determining a chrominance compression scaling factor based on a ratio of the linearly transformed the input pixel C value and the input pixel C, and multiplying the input pixel U and V values by the chrominance compression scaling factor.

In one or more second embodiment, an adaptive color compression module includes an input to receive image pixel values. The module includes a source-target gamut analysis module coupled to the image pixel value input, the source-target gamut analysis module having logic circuitry to determine source gamut information associated with the input image pixel values, and to perform a comparison between the sRGB color gamut and an output color gamut associated with an image pixel destination. The adaptive color compression module includes a color gamut compression module coupled to the source-target gamut analysis module, the color gamut compression module including logic circuitry to adjust a color of one or more of the input image pixel values by adapting between a fixed-hue gamut compression mode and a semi-fixed-hue gamut compression mode based on the comparison and the source gamut information.

In furtherance of the one or more second embodiment, the source-target gamut analysis module is further to compare xy chromaticity values of sRGB primaries to xy chromaticity values of output gamut primaries, and compare an output gamut area defined by the xy chromaticity values of the output gamut primaries with an sRGB gamut area defined by the xy chromaticity values of the sRGB primaries.

In furtherance of the embodiment immediately above, the source-target gamut analysis module is further to cause the gamut compression module to bypass gamut compression in response to the xy chromaticity values of the output gamut primaries differing from the xy chromaticity values of sRGB primaries by more than a first predetermined threshold, and the output gamut area failing to be smaller than the sRGB gamut area by a second predetermined threshold.

In furtherance of the embodiment immediately above, the source-target gamut analysis module is further to receive a mapping mode signal, set a chrominance compression scaling factor equal to a function of the AR in response to the mapping mode signal being indicative of a saturation mode or a relative colorimetric mode, or determine an inner and outer line of compression within which pixel values are to be compressed based on the AR in response to the mapping mode signal being indicative of a perceptual mode. Also in furtherance of the embodiment immediately above the gamut compression module is further to perform semi-fixed-hue gamut compression with a chrominance compression scaling factor determined based on a ratio of the output gamut area and the sRGB gamut area, and further based on a mapping mode selectable between a perceptual mode and at least one of a saturation mode and relative colorimetric mode.

In furtherance of the embodiment immediately above, the gamut compression module further includes a color space conversion logic circuit to transform the input pixel values from luma, chrominance (YUV) space to lightness, chroma, hue (LCH) space. The gamut compression module further includes a scaling and transformed luminance calculation logic circuit, coupled to the color space conversion logic circuit, and to determine an sRGB boundary for a hue angle of an input pixel, determine a compression line slope and linear transform parameters based on the sRGB boundary. The gamut compression module further includes a fixed-hue gamut compression logic circuit to move a pixel value outside of the sRGB boundary inward based at least on the compression line slope, linear transform parameters, and the inner and outer line of compression.

In one or more third embodiment, a mobile device includes a display screen having an output color gamut, a memory to store raw image pixel values having a source color gamut, and a processor including the color gamut compression module in any of the embodiments above with the color gamut compression module coupled to the memory to receive the image pixel values, and further coupled to the display to output the image pixel values subsequent to the color adjustment.

In one or more fourth embodiment, one or more computer-readable storage media, with instructions stored thereon, which when executed by a processor, cause the processor to perform a method comprising receiving input image pixel values, determining source gamut information associated with the input image pixel values, and performing a comparison between the sRGB color gamut and an output color gamut associated with an image pixel destination. The method performed further includes adjusting one or more of the input image pixel values by performing a fixed-hue gamut compression or a semi-fixed-hue gamut compression depending on the comparison and the source gamut information. The method performed further includes storing the color adjusted input image pixel to a memory.

In furtherance of the one or more fourth embodiment, the instructions stored thereon, which when executed by the processor, further cause the processor to perform the method further comprising comparing xy chromaticity values of sRGB primaries to xy chromaticity values of output gamut primaries, and comparing an output gamut area defined by the xy chromaticity values of the output gamut primaries with an sRGB gamut area defined by the xy chromaticity values of the sRGB primaries.

In furtherance of the one or more fourth embodiment, the instructions stored thereon, which when executed by the processor, further cause the processor to perform the further comprising: comparing xy chromaticity values of sRGB primaries to xy chromaticity values of the output gamut primaries, and comparing an output gamut area defined by the xy chromaticity values of the output gamut primaries with an sRGB gamut area defined by the xy chromaticity values of the sRGB primaries. The media further comprises instructions stored thereon, which when executed by the processor, further cause the processor to perform the further comprising bypassing the gamut compression in response to the chromaticity values of the output gamut primaries differing from the chromaticity values of sRGB primaries by more than a first predetermined threshold, and the output gamut area failing to be smaller than the sRGB gamut area by a second predetermined threshold.

In one or more fifth embodiment, one or more computer-readable storage media, with instructions stored thereon, which when executed by a processor, cause the processor to perform any of the first embodiments described above.

In one or more sixth embodiment, an adaptive color compression means includes an input means for receiving input image pixel values. The color compression means comprises an input analysis means for determining source gamut information associated with the input image pixel values. The color compression means comprises a gamut analysis means for performing a comparison between the sRGB color gamut and an output color gamut associated with an image pixel destination. The color compression means comprises a gamut compression means for adjusting one or more of the input image pixel values by performing a fixed-hue gamut compression or a semi-fixed-hue gamut compression depending upon the comparison and the source gamut information.

In one or more seventh embodiment, a mobile device, includes a display means having an output color gamut, a memory means for storing raw image pixel values having a source color gamut, and a processor including an adaptive color gamut compression means. The adaptive color gamut compression means further includes an input means for receiving input image pixel values. The adaptive color gamut compression means an input analysis means for determining source gamut information associated with the input image pixel values. The adaptive color gamut compression means a gamut analysis means for performing a comparison between the sRGB color gamut and an output color gamut associated with an image pixel destination. The adaptive color gamut compression means includes a gamut compression means for adjusting one or more of the input image pixel values by performing a fixed-hue gamut compression or a semi-fixed-hue gamut compression depending upon the comparison and the source gamut information. The adaptive color gamut compression means is coupled to the memory means to receive the image pixel values, and is coupled to the display means to output the image pixel values subsequent to the color adjustment.

In one or more eighth embodiment, any of the first embodiments described above include the fixed-hue gamut compression, and the fixed-hue gamut compression further comprises transforming the input pixel values from luma, chrominance (YUV) space to lightness, chroma, hue (LCH) space. The fixed-hue gamut compression further comprises determining a chroma and lightness value of a vertex of the sRGB boundary based on a hue angle of the input pixel. The fixed-hue gamut compression further comprises determining a compression line intersecting the input pixel L and C values based on a slope of an sRGB boundary line intersecting the vertex. The fixed-hue gamut compression further comprises determining a first distance between the input pixel L and C values and corresponding values at an intersection of the compression line and the L-axis. The fixed-hue gamut compression further comprises determining a second distance between the input pixel L and C values and corresponding values at an intersection of the compression line and the sRGB boundary. The fixed-hue gamut compression further comprises linearly transforming the input pixel L and C values based on the first and second distances. The linearly transforming further comprises determining an internal line and external line of compression parallel to, and on either side of the sRGB boundary, based on the on the comparison between the sRGB color gamut and the output color gamut. The linearly transforming further comprises moving pixel input values on the sRGB boundary to the internal line of compression. The linearly transforming further comprises moving pixel input values on the external line of compression to the sRGB boundary. The linearly transforming further comprises moving pixel input values on the sRGB boundary to the internal line of compression.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented image processing method, comprising:
    receiving input image pixel values;
    determining source gamut information associated with the input image pixel values;
    performing a comparison between an sRGB color gamut and an output color gamut associated with an image pixel destination;
    adjusting one or more of the input image pixel values by performing a fixed-hue gamut compression or a semi-fixed-hue gamut compression depending upon the comparison and the source gamut information; and
    storing the color-adjusted input image pixel to a memory.

2. The method of claim 1, wherein performing the comparison between the sRGB color gamut and the output color gamut further comprises:
    comparing xy chromaticity values of sRGB primaries to xy chromaticity values of output gamut primaries; and
    comparing an output gamut area defined by the xy chromaticity values of the output gamut primaries with an sRGB gamut area defined by the xy chromaticity values of the sRGB primaries.

3. The method of claim 1, wherein performing the comparison between the sRGB color gamut and the output color gamut further comprises:
    comparing xy chromaticity values of sRGB primaries to xy chromaticity values of the output gamut primaries; and
    comparing an output gamut area defined by the xy chromaticity values of the output gamut primaries with an sRGB gamut area defined by the xy chromaticity values of the sRGB primaries; and
    wherein the method further comprises bypassing the gamut compression in response to:
        the xy chromaticity values of the output gamut primaries differing from the xy chromaticity values of sRGB primaries by more than a first predetermined threshold; and
        the output gamut area failing to be smaller than the sRGB gamut area by a second predetermined threshold.

4. The method of claim 1, wherein performing the comparison between the sRGB color gamut and the output color gamut further comprises:
    comparing xy chromaticity values of sRGB primaries to xy chromaticity values of the output gamut primaries; and
    comparing an output gamut area defined by the xy chromaticity values of the output gamut primaries with an sRGB gamut area defined by the xy chromaticity values of the sRGB primaries; and
    wherein the method further comprises performing the semi-fixed-hue gamut compression with a chrominance compression scaling factor determined based on a ratio of the output gamut area and the sRGB gamut area, and based on a mapping mode selectable between a perceptual mode and at least one of a saturation mode and relative colorimetric mode.

5. The method of claim 4, wherein performing the semi-fixed-hue gamut compression further comprises:
    determining a chrominance compression scaling factor based on an area ratio (AR) of the output gamut area to the sRGB gamut area (AR); and
    scaling a chrominance value of the input pixels with the chrominance compression scaling factor.

6. The method of claim 5, wherein determining the chrominance compression scaling factor based on the AR further comprises:
    setting the chrominance compression scaling factor equal to a function of the AR in response to a selection of the saturation mode or relative colorimetric mode; or
    determining an inner and outer line of compression within which pixel values are to be compressed based on the AR in response to a selection of the perceptual mode.

7. The method of claim 6, wherein the semi-fixed-hue gamut compression further comprises:
    transforming the input pixel values from luma, chrominance (YUV) space to lightness, chroma, hue (LCH) space;
    determining an sRGB boundary for a hue angle of an input pixel;
    determining a compression line slope and linear transform parameters based on the sRGB boundary; and
    moving a pixel value outside of the sRGB boundary inward based at least on the compression line slope, linear transform parameters, and inner and outer line of compression.

8. The method of claim 1, wherein the semi-fixed-hue gamut compression further comprises:
- transforming the input pixel values from luma, chrominance (YUV) space to lightness, chroma, hue (LCH) space;
- determining a chroma and lightness value of a vertex of the sRGB boundary based on a hue angle of the input pixel;
- determining a compression line intersecting the input pixel L and C values based on a slope of an sRGB boundary line intersecting the vertex;
- determining a first distance between the input pixel L and C values and corresponding values at an intersection of the compression line and the L-axis;
- determining a second distance between the input pixel L and C values and corresponding values at an intersection of the compression line and the sRGB boundary; and
- linearly transforming the input pixel L and C values based on the first and second distances, wherein the linearly transforming further comprises:
  - determining an internal line and external line of compression parallel to, and on either side of the sRGB boundary, based on the comparison between the sRGB color gamut and the output color gamut;
  - moving pixel input values on the sRGB boundary to the internal line of compression; and
  - moving pixel input values on the external line of compression to the sRGB boundary.

9. The method of claim 8, wherein determining the internal line and external line of compression based on the comparison between the sRGB color gamut and the output color gamut further comprises:
- determining default values for the internal and external lines of compression associated with the sRGB gamut; and
- modifying the default values as a function of a difference between an output gamut area defined by xy chromaticity values of the output gamut primaries, and an sRGB gamut area defined by xy chromaticity values of the sRGB primaries.

10. The method of claim 8, wherein the semi-fixed-hue gamut compression further comprises:
- determining a chrominance compression scaling factor based on a ratio of the linearly transformed input pixel C value and the input pixel C value; and
- multiplying the input pixel U and V values by the chrominance compression scaling factor.

11. An adaptive color compression device, comprising:
an input to receive image pixel values; and
a one or more processors coupled to the input, the processors to:
- determine source gamut information associated with the input image pixel values;
- perform a comparison between an sRGB color gamut and an output color gamut associated with an image pixel destination; and
- adjust a color of one or more of the input image pixel values by an adaptation between a fixed-hue gamut compression mode and a semi-fixed-hue gamut compression mode that is based on the comparison and the source gamut information.

12. The adaptive color compression device of claim 11, wherein the processors are further to:
- compare xy chromaticity values of sRGB primaries to xy chromaticity values of output gamut primaries; and
- compare an output gamut area defined by the xy chromaticity values of the output gamut primaries with an sRGB gamut area defined by the xy chromaticity values of the sRGB primaries.

13. The adaptive color compression device of claim 12, wherein the processors are further to:
- cause the gamut compression module to bypass gamut compression in response to:
  - the xy chromaticity values of the output gamut primaries differing from the xy chromaticity values of sRGB primaries by more than a first predetermined threshold; and
  - the output gamut area failing to be smaller than the sRGB gamut area by a second predetermined threshold.

14. The adaptive color compression device of claim 13, wherein the processors are further to:
- receive a mapping mode signal;
- set a chrominance compression scaling factor equal to a function of an area ratio (AR) of the output gamut area to the sRGB gamut area in response to the mapping mode signal being indicative of a saturation mode or a relative colorimetric mode; or
- determine an inner and outer line of compression within which pixel values are to be compressed based on the AR in response to the mapping mode signal being indicative of a perceptual mode.

15. The adaptive color compression device of claim 13, wherein the processors are further to:
- perform semi-fixed-hue gamut compression with a chrominance compression scaling factor determined based on a ratio of the output gamut area and the sRGB gamut area, and further based on a mapping mode selectable between a perceptual mode and at least one of a saturation mode and relative colorimetric mode.

16. The adaptive color compression module device of claim 15, wherein the processors are to:
- transform the input pixel values from luma, chrominance (YUV) space to lightness, chroma, hue (LCH) space;
- determine an sRGB boundary for a hue angle of an input pixel;
- determine a compression line slope and linear transform parameters based on the sRGB boundary; and
- move a pixel value outside of the sRGB boundary inward based at least on the compression line slope, linear transform parameters, and the inner and outer line of compression.

17. A mobile device, comprising:
- a display screen having an output color gamut;
- a memory to store raw image pixel values having a source color gamut; and
- a processor including the adaptive color compression device of claim 11, wherein the processors are coupled to the memory to receive the image pixel values, and are coupled to the display to output the image pixel values subsequent to the color adjustment.

18. One or more non-transitory computer-readable storage media, with instructions stored thereon, which when executed by a processor, cause the processor to perform a method comprising:
- receiving input image pixel values;
- determining source gamut information associated with the input image pixel values;
- performing a comparison between an sRGB color gamut and an output color gamut associated with an image pixel destination;

adjusting one or more of the input image pixel values by performing a fixed-hue gamut compression or a semi-fixed-hue gamut compression depending on the comparison and the source gamut information; and storing the color adjusted input image pixel to a memory.

19. The media of claim 18, further comprising instructions stored thereon, which when executed by the processor, further cause the processor to perform the method further comprising:

comparing xy chromaticity values of sRGB primaries to xy chromaticity values of output gamut primaries; and comparing an output gamut area defined by the xy chromaticity values of the output gamut primaries with an sRGB gamut area defined by the xy chromaticity values of the sRGB primaries.

20. The media of claim 18, further comprising instructions stored thereon, which when executed by the processor, further cause the processor to perform the method further comprising:

comparing xy chromaticity values of sRGB primaries to xy chromaticity values of the output gamut primaries; and comparing an output gamut area defined by the xy chromaticity values of the output gamut primaries with an sRGB gamut area defined by the xy chromaticity values of the sRGB primaries; and wherein the media further comprises instructions stored thereon, which when executed by the processor, further cause the processor to perform the method further comprising bypassing the gamut compression in response to:

the chromaticity values of the output gamut primaries differing from the chromaticity values of sRGB primaries by more than a first predetermined threshold; and the output gamut area failing to be smaller than the sRGB gamut area by a second predetermined threshold.

* * * * *